United States Patent
Han et al.

[11] Patent Number: 6,166,936
[45] Date of Patent: Dec. 26, 2000

[54] NON-DIRECTIONAL FREQUENCY GENERATOR

[75] Inventors: Yong-woon Han, Kunpo; Seong-deog Jang; Kwang-seok Kang, both of Suwon; Han-jun Sung, Seoul, all of Rep. of Korea

[73] Assignee: SamSung Electronics Co., Ltd., Kyungki-do, Rep. of Korea

[21] Appl. No.: 09/502,075

[22] Filed: Feb. 10, 2000

[30] Foreign Application Priority Data

Sep. 27, 1999 [KR] Rep. of Korea ............... P99-41340

[51] Int. Cl.[7] ............................................. H02M 7/60
[52] U.S. Cl. ............................................................ 363/109
[58] Field of Search ................................ 363/102, 106, 363/107, 109, 120–122, 165, 170, 171, 174, 176, 177; 310/127, 148, 219, 220, 229, 242, 262, 265, 268

[56] References Cited

U.S. PATENT DOCUMENTS

| | | | |
|---|---|---|---|
| 4,024,525 | 5/1977 | Baumgartner et al. | 340/267 R |
| 4,194,239 | 3/1980 | Jayaram et al. | 363/109 |
| 5,633,792 | 5/1997 | Massey | 363/109 |
| 6,081,082 | 6/2000 | Kim et al. | 318/140 |

*Primary Examiner*—Matthew Nguyen
*Attorney, Agent, or Firm*—Robert E. Bushnell, Esq.

[57] ABSTRACT

A non-directional frequency generator capable of minimizing frictional noise generated due to a mechanical rotation mechanism, including: a plurality of brushes connected with a direct current power source; and a commutator which converts a direct current waveform inputted from one of the brushes into an alternating current waveform by a rotational movement thereof, having a groove formed on an outer circumference thereof slanted inward to the commutator so as to reduce friction with the brushes during the rotation thereof.

4 Claims, 4 Drawing Sheets

NON-DIRECTIONAL FREQUENCY GENERATOR

CLAIM OF PRIORITY

This application makes reference to, incorporates the same herein, and claims all benefits accruing under 35 U.S.C. § 119 from an application entitled NON DIRECTIONAL FREQUENCY GENERATOR earlier filed in the Korean Industrial Property Office on the 27th day of September 1999 and there duly assigned Ser. No. 1999-41340, a copy of which is annexed hereto.

BACKGROUND OF THE INVENTION

1. Field of the Invention

The present invention relates to a non-directional frequency generator, and more particularly to a non-directional frequency generator for converting direct current into alternating current.

2. Description of the Related Art

Generally, a non-directional frequency generator is a device for converting direct current into alternating current using a general relay or a semiconductor element, and a method that uses the semiconductor element such as a thyrister, etc., is mostly employed.

In such a semiconductor non-directional frequency generator circuit, a trigger circuit section is connected with a direct current power source, and a plurality of thyristers are alternately turned on/off by a switching operation of the trigger circuit section, and accordingly, the electric current flowing through a transformer reverses its direction. Accordingly, alternating current of a certain voltage is generated at an output end of the transformer.

In a conventional semiconductor non-directional frequency generator circuit, in order to generate a high output of alternating current, an expensive semiconductor element has to be employed, increasing the manufacturing cost. Further, there is a great loss of output of the semiconductor element due to the switching operation, while excessive heat is generated due to the output loss.

In order to solve the above-mentioned problems, a non-directional frequency generator for converting the direct current into alternating current by using rotatable direct current inverting means was disclosed by the same applicant of this application in the Korean Patent Application No. 98-18589 (filed May 22, 1998), and the Korean Patent Application No. 98-21117 (filed Jun. 8, 1998), which are not published now.

Hereinafter, the above non-directional frequency generator will be briefly described with reference to the accompanied drawing as a related art.

FIG. 1 is a schematic view of a non-directional frequency generator driven by the direct current power source according to the related art.

Referring to FIG. 1, the non-directional frequency generator 100 includes a motor 110 driven by the direct current power source for generating a rotational force, a commutator 130 rotated by the motor 110, and a plurality of brushes in contact with an outer circumference of the commutator 130, such as the first, second, third, and fourth brushes 121–124 as shown in FIG. 1. The commutator 130 includes a cylindrical body 131, a conductive part which is divided into an even number of parts but divided into at least two conductive parts 132a and 132b on the circumferential surface of the body 131 as shown in FIG. 1, and an insulating part 133 formed therebetween on the circumference of the commutator body. Each of conductive parts 132a and 132b and at least two neighboring brushes of the first, second, third, and fourth brushes 121–124 are in simultaneous contact with each other. The direct current power source is connected with the first and third brushes 121 and 123, while the second and fourth brushes 122 and 124 are connected with a transformer T. First and second relays RY1 and RY2 turn on/off the operation of the non-directional frequency generator.

The operation of the non-directional frequency generator 100 will be described below: First, the first and second relays RY1 and RY2 are in on-state, and the commutator 130 is rotated by the motor 110. Accordingly, the brushes 121–124 in contact with the commutator 130 come into contact with the conductive part 132a, the insulating part 133, the conductive part 132b, and the insulating part 133 in a sequential manner, respectively.

More specifically, as the first brush 121 comes into contact with the conductive part 132a of the commutator 130, electric current flows through the positive terminal of the direct current power source DC, the first brush 121, the conductive part 132a of the commutator 130, the second brush 122, and then to the upper portion of a primary coil 202 of the transformer T downwardly to the low portion thereof. Then, the electric current flows through the second brush 122, the negative terminal of the direct current source DC via the conductive part 132b, and the third brush 123.

Next, while the commutator 130 is rotated, as the first brush 121 comes into the contact with the insulating part 133, the electric current does not flow through the commutator 130.

Then, as the commutator 130 rotates to ninety degree (90°), the electric current from the positive terminal of the direct current source DC flows through the first brush 121, and the conductive part 132b of the commutator 130, and the second brush 122, and reverses its direction upwardly to the upper portion of the primary coil 202 of the transformer T from the lower portion of the primary coil 202 of the transformer T. Then, the electric current flows through the fourth brush 124, the negative terminal of the direct current power source DC via the conductive part 132a of the commutator 130 and the third brush 123.

Accordingly, by the constant rotation of the commutator 130 of the non-directional frequency generator, the alternating current is generated at the primary coil 202 of the transformer T.

During the rotation of the commutator 130, each of brushes 121–124 comes in contact with the conductive part 132a, the insulating part 133, the conductive part 132b, and the insulating part 133 formed on the outer circumference of the commutator 130, in a sequential manner, respectively.

Meanwhile, different substances of the conductive parts 132a and 132b and the insulating part 131 of the commutator 130 cause various problems. That is, since heat is generated during the rotation of the commutator 130, the conductive parts 132a and 132b having high heat conductivity are heat-expanded and the expanded conductive parts 132a and 132b form coating layer on the insulating part 133. To prevent this phenomena, grooves 134 are formed between the conductive parts 132a and 132b and the insulating part 133.

However, since the grooves 134 are formed in perpendicular relation with respect to the rotating surface of the commutator 130, there is another problem of friction noise caused due to the collision of the edges of the grooves 134 with the brushes 121–124 during the rotation of the commutator 130.

SUMMARY OF THE INVENTION

The present invention has been developed to overcome the above-mentioned problems of the related art, and accordingly it is an object of the present invention to provide a non-directional frequency generator having minimized friction noise which is caused due to a mechanical rotation mechanism.

The above object is accomplished by a non-directional frequency generator according to the present invention, including: a plurality of brushes connected with a direct current power source; and a commutator for converting a direct current waveform inputted from one of the brushes into an alternating current waveform by a rotation thereof, the commutator having a groove formed on an outer circumference thereof slanted inward to the commutator so as to reduce the friction with the brushes during the rotation thereof.

The groove is slanted inward toward the commutator along the direction of the rotation of the commutator.

An obtuse angle formed on the outer circumference of the commutator due to the slanted groove is smoothly curved, so as to lessen the shock between the commutator and the brushes when the brushes pass by the groove formation area during the rotation of the commutator.

The groove is formed between a conductive part and an insulating part which are formed on the outer circumference of the commutator and are exposed externally.

As described, in the non-directional frequency generator according to the present invention, the grooves formed on the outer circumference of the commutator between the conductive part and the insulating part are slant formed inward to the commutator along the direction of the rotation of the commutator. Accordingly, during the rotation of the commutator, the shock between the brushes and the commutator is reduced, and the noise of the non-directional frequency generator can be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
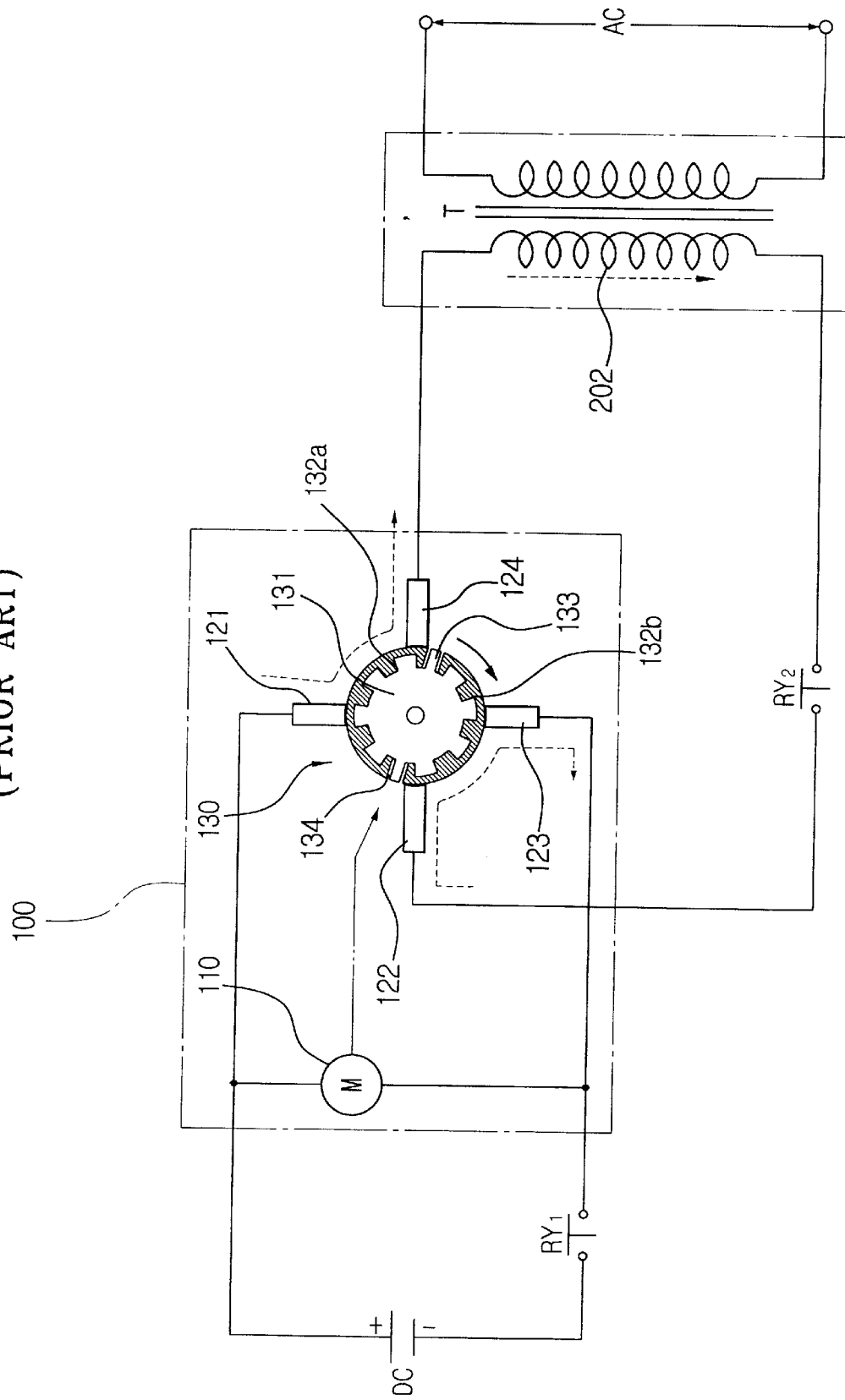
FIG. 1 is a schematic circuit for showing a non-directional frequency generator according to the related art.

Hereinafter, the preferred embodiment of the present invention will be described in greater detail with reference to the accompanied drawings, while the like elements are referred to by the same reference numerals throughout.

Figure 2A:
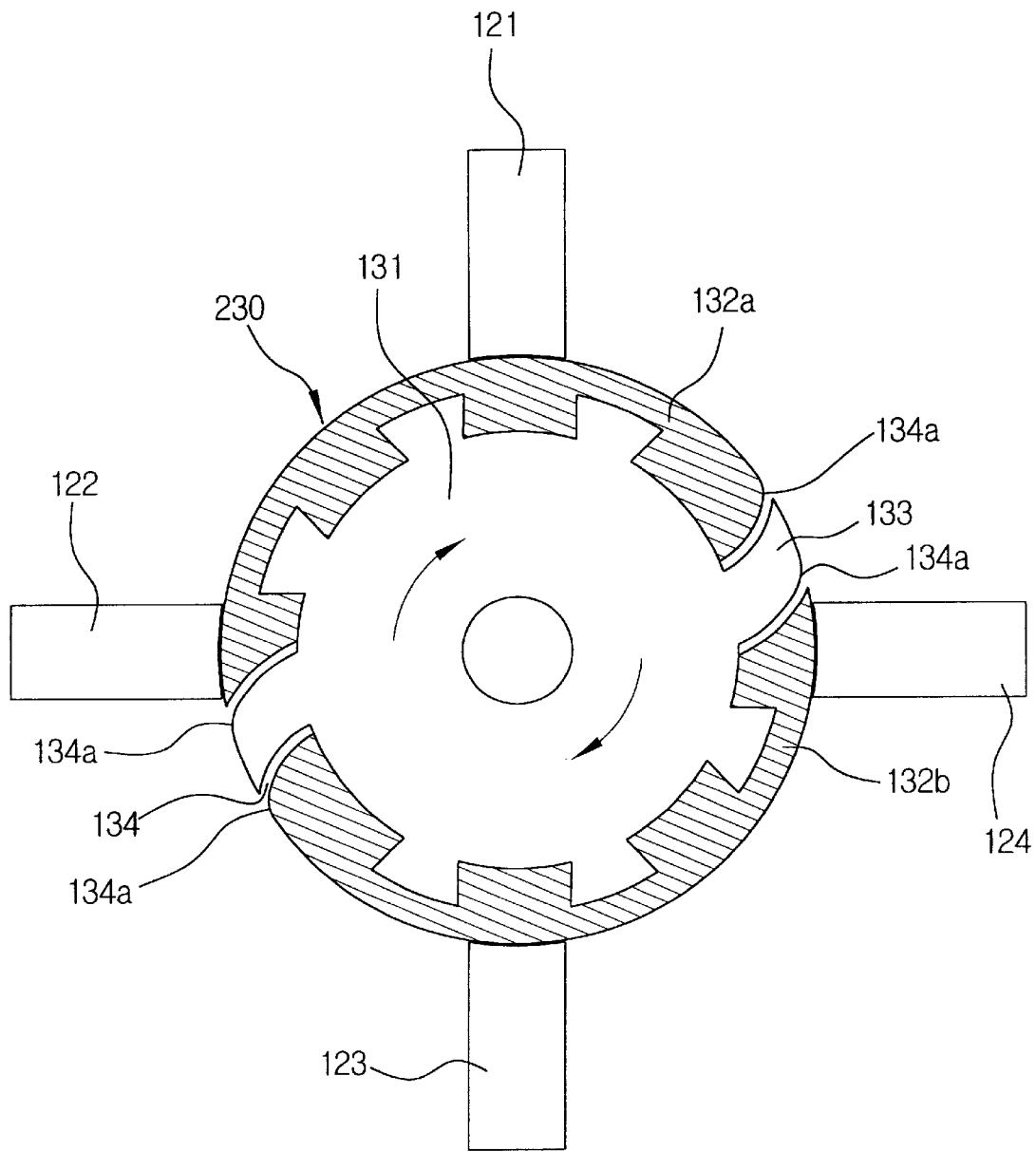
FIG. 2A is a sectional view for showing a commutator and a plurality of brushes of a non-directional frequency generator according to a preferred embodiment of the present invention.
Figure 2B:
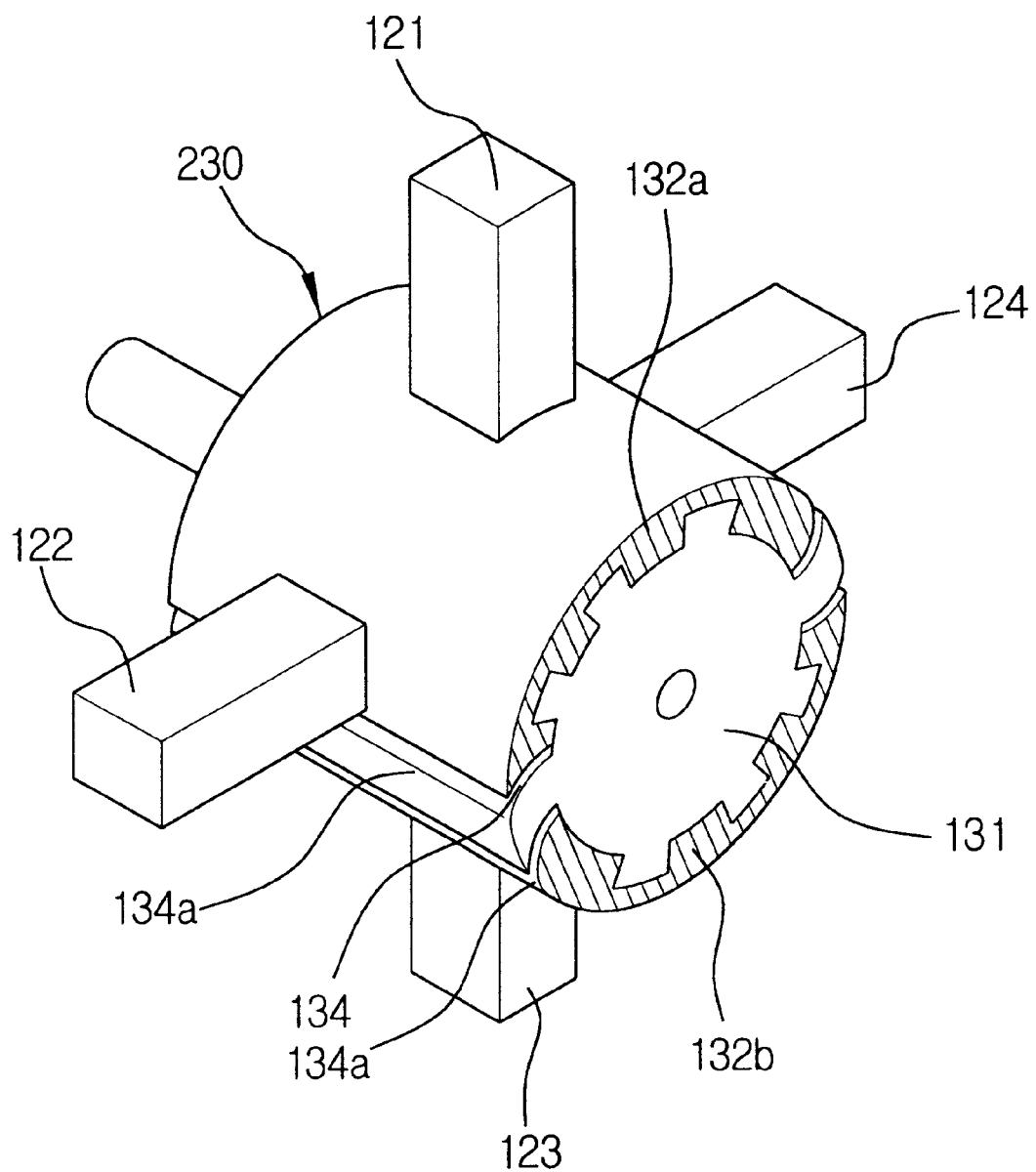
FIG. 2B is a perspective view for schematically showing the commutator and the plurality of brushes of FIG. 2A.

FIG. 2A is a sectional view for schematically showing a commutator and a plurality of brushes of a non-directional frequency generator according to a preferred embodiment of the present invention, and FIG. 2B is a schematic perspective view of FIG. 2A.

Figure 3:
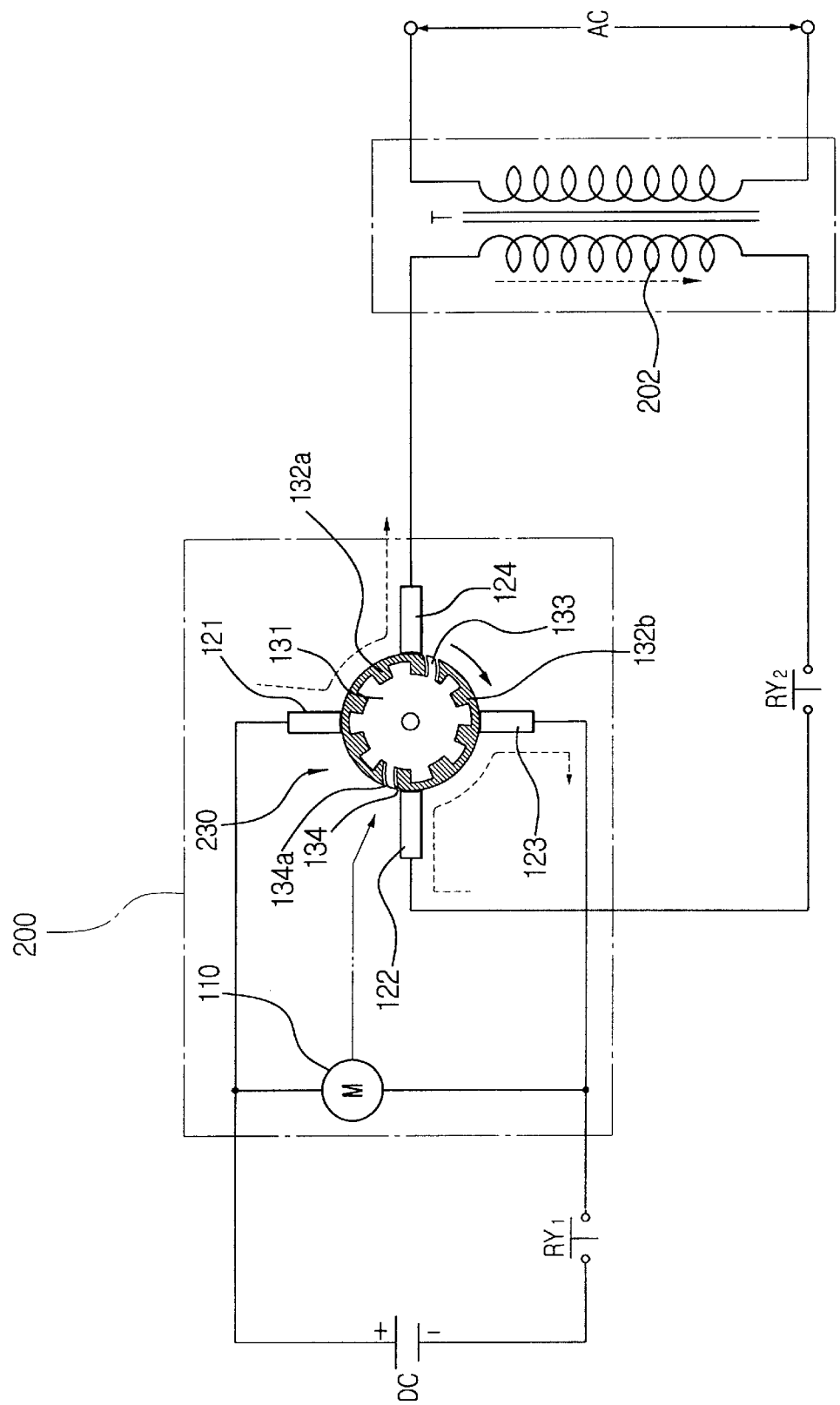
FIG. 3 is a schematic circuit for showing the non-directional frequency generator having the commutator and the plurality of brushes of FIG. 3.

FIG. 3 is a circuit for schematically showing the non-directional frequency generator having the commutator and the plurality of brushes of FIG. 3.

Referring to FIGS. 2A and 2B, a commutator 230 of a non-directional frequency generator 200 of the present invention includes a cylindrical body 131, conductive parts 132a and 132b, and an insulating part 133 of a certain width formed between the conductive parts 132a and 132b on an outer circumference of the body 131. The conductive parts 132a and 132b are divided into an even number but into at least two.

The conductive parts 132a and 132b are in simultaneous contact with at least two of the respective neighboring brushes 121–124.

The different substances of the conductive parts 132a and 132b exposed on the outer circumferential surface of the body 131 of the commutator 130 and the insulating part 131 cause various problems. That is, since heat is generated during the rotation of the commutator 130, the conductive parts 132a and 132b having high heat conductivity are heat-expanded so that the expanded conductive parts 132a and 132b form coating layer on the insulating part 133. To prevent this phenomena in the present invention, grooves 134 are formed between the conductive parts 132a and 132b and the insulating part 133.

The grooves 134 are formed on the commutator 230 in a slanted manner with respect to the rotating surface of the commutator 230. Further, the grooves 134 are formed inward to the commutator 230 along a direction of rotation of the commutator 230. Since the grooves 134 are slanted, obtuse angles 134a formed on the outer circumference of the commutator 230 next to the grooves 134 are smoothly curved. Accordingly, during the rotation of the commutator 230, the degree of shock between the obtuse angles 134a and the brushes 121–124 is lessened when the brushes 121–124 pass by the groove formative area of the commutator 230.

The non-directional frequency generator having the commutator 230 and the brushes 121–124 will be described briefly below.

Referring to FIG. 3, the non-directional frequency generator 200 includes a motor driven by the direct current power source DC 110 for generating the rotational force, a commutator 230 rotated by the motor 110, and a plurality of brushes in contact with the outer circumference of the commutator 230, such as first, second, third, and fourth brushes 121–124 as shown in FIG. 3. The commutator 230 has the same construction as described above. The direct current power source DC is connected with input brushes, e.g., the first and third brushes 121 and 123, while the transformer T is connected with the output brushes, e.g., the second and fourth brushes 122 and 124. First and second relays RY1 and RY2 turn on/off the operation of the non-directional frequency generator 200.

The operation of the non-directional frequency generator 200 is as follows: First, the first and second relays RY1 and RY2 are in the on-state, and the commutator 230 is rotated clockwise by the direct current power source DC. Accordingly, the brushes 121–124 in contact with the outer circumference of the commutator 230 come in contact with the conductive part 132a, the insulating part 133, the conductive part 132b, and the insulating part 133, in a sequential manner, respectively.

More specifically, as the first brush 121 comes into contact with the conductive part 132a of the commutator 230, electric current flows through the positive terminal of the direct current power source DC, the first brush 121, the conductive part 132a, the second brush 122 of the commutator 230, and then to the upper portion of a primary coil 202 of the transformer T downwardly to the low portion thereof. Then, the electric current flows through the second brush 122, the negative terminal of the direct current source DC via the conductive part 132b, and the third brush 123.

Next, while the commutator 230 is still rotated, as the first brush 121 comes into the contact with the insulating art 133, the electric current does not flow through the commutator 130.

Then, as the commutator 230 rotates to ninety degree (90°), the electric current from the positive terminal of the direct current source DC flows through the first brush 121, and the conductive part 132b of the commutator 130, and the second brush 122, and reverses its direction upwardly to the upper portion of the primary coil 202 of the transformer T from the lower portion of the primary coil 202 of the transformer T. Then, the electric current flows through the fourth brush 124, the negative terminal of the direct current power source DC via the conductive part 132a of the commutator 230 and the third brush 123.

In such a manner, the alternating current is generated at the primary coil 202 of the transformer T during the constant rotation of the commutator 230 of the non-directional frequency generator.

In such a situation, the commutator 230 is rotated while the brushes 121–124 come in contact with the conductive part 132a, the insulating part 133, the conductive part 132b, and the insulating part 133 which are formed on the outer circumference of the commutator 230, sequentially.

Since the grooves 134 are slanted and the obtuse angles 134a are smoothly curved, the degree of shock between the obtuse angles 134a and the brushes 121–124 is reduced when the brushes 121–124 pass by the groove formation area during the rotation of the commutator 230.

As described, in the non-directional frequency generator according to the present invention, the grooves formed on the outer circumference of the commutator between the conductive part and the insulating part are slant formed inward to the commutator along the direction of the rotation of the commutator. Accordingly, during the rotation of the commutator, the shock between the brushes and the commutator is reduced, and the noise of the non-directional frequency generator can be reduced. Also, the lifetime of the non-directional frequency generator is lengthened, while the stable operation of the commutator can be guaranteed.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A non-directional frequency generator comprising:
    a plurality of brushes connected with a direct current power source; and
    a commutator for converting a direct current waveform inputted from one of the brushes into an alternating current waveform by a rotation thereof, the commutator having a groove formed on an outer circumference thereof slanted inward to the commutator so as to reduce friction with the brushes during the rotation thereof.

2. The non-directional frequency generator as claimed in claim 1, wherein the groove is slanted inward to the commutator along the direction of the rotation of the commutator.

3. The non-directional frequency generator as claimed in claim 1, wherein an obtuse angle formed oil the outer circumference of the commutator due to the slanted groove is smoothly curved, so as to lessen the shock between the commutator and the brushes when the brushes are passed by the groove formation area during the rotation of the commutator.

4. The non-directional frequency generator as claimed in claim 1, wherein the groove is formed between a conductive part and an insulating part which are formed on the outer circumference of the commutator and are exposed externally.

* * * * *